United States Patent
Gulsun et al.

(10) Patent No.: US 8,073,227 B2
(45) Date of Patent: Dec. 6, 2011

(54) SYSTEM AND METHOD FOR GEOMETRIC MODELING OF TUBULAR STRUCTURES

(75) Inventors: Mehmet Akif Gulsun, Lawrenceville, NJ (US); Huseyin Tek, Princeton, NJ (US)

(73) Assignee: Siemens Aktiengesellschaft, München (DE)

( * ) Notice: Subject to any disclaimer, the term of this patent is extended or adjusted under 35 U.S.C. 154(b) by 436 days.

(21) Appl. No.: 12/437,146

(22) Filed: May 7, 2009

(65) Prior Publication Data

US 2009/0278846 A1   Nov. 12, 2009

Related U.S. Application Data

(60) Provisional application No. 61/051,811, filed on May 9, 2008.

(51) Int. Cl.
*G06K 9/00* (2006.01)
(52) U.S. Cl. .................................... 382/131
(58) Field of Classification Search .......... 382/131, 382/173
See application file for complete search history.

(56) References Cited

U.S. PATENT DOCUMENTS

| 7,043,290 B2 * | 5/2006 | Young et al. | 600/416 |
| 7,970,193 B2 * | 6/2011 | Rouet et al. | 382/131 |

* cited by examiner

*Primary Examiner* — Roy M Punnoose
(74) *Attorney, Agent, or Firm* — Donald B. Paschburg; F. Chau & Associates, LLC

(57) ABSTRACT

A method for extracting a centerline of a tubular structure in a digital medical image includes providing a 3-dimensional (3D) digitized medical image having a segmented tubular structure, finding a path in the image between a starting point and every other point in the tubular structure that minimizes an accumulative cost function, wherein the minimum accumulative cost $\phi(x)$ at a point x is a minimum of $(\phi(x')+P_{x,x'})$ over all nearest neighbors x' wherein $P_{x,x'}$ is a cost of propagation obtained from the inverse of a medialness measure computed in a plane orthogonal to a line between x and x' that is centered at a mid-point of the line, the medialness measure $m(x)$ computed in a circular region $C(x, R)$ centered at point x on the line, with radius R, given by wherein $\vec{u}(\alpha) = \sin(\alpha)\vec{u}_1 + \cos(\alpha)\vec{u}_2$ and $\vec{u}_1$ and $\vec{u}_2$ define a 2D plane, and $f(x_0, R\vec{u}(\alpha))$ is $$f(x_o, R) = \max\left(\frac{\frac{1}{R}\sum_{x=x_0}^{x_0+R} I(x) - \frac{1}{M}\sum_{x=x_0+R+1}^{x_0+R+1+M} I(x)}{2}, 0\right).$$

wherein M is the number of background points.

20 Claims, 10 Drawing Sheets

(a)

(b)           (c)

(a)

(b)            (c)

(a)                  (b)

(a)

(b)

(c)

SYSTEM AND METHOD FOR GEOMETRIC MODELING OF TUBULAR STRUCTURES

CROSS REFERENCE TO RELATED UNITED STATES APPLICATIONS

This application claims priority from "Geometric Modeling of Tubular Structures", U.S. Provisional Application No. 61/051,811 of Gulsun, et al., filed May 9, 2008, the contents of which are herein incorporated by reference in their entirety.

TECHNICAL FIELD

This disclosure is directed to the extraction of center axes of tubular shapes in digital medical images.

DISCUSSION OF THE RELATED ART

Geometric modeling of tubular structures from medical images such as contrast enhanced (CE) Computer Tomography Angiography (CTA) and Magnetic Resonance Angiography (MRA) is still an important problem in clinical applications. The most common tubular structures include blood vessels, airways in lungs, colon and certain types of bones such as ribs. While most medical structures can be represented by their surface models, center axis (or centerlines) are the most common representations for these tubular structures. They are important for clinical applications, including: (1) quick diagnosis via visualizing tubular structures in curved multi-planar reformatting (MPR); (2) quantification of pathologies in cross-sectional views such as determination of a degree of a stenosis; and (3) path planning for interventional operations. In addition to these common clinical applications, centerline based representations are often used in registering multi-modal data such as CTA to 3D fluoroscopy for treatment planning. One has to observe that the accuracy of centerlines is extremely important in such applications, i.e. often subvoxel accuracy is required for small vessel such as coronaries. For example, errors in the location of centerlines translate to incorrect ribbon visualization and incorrect cross-sectional estimations.

FIGS. 1(a)-(b) illustrate some of these issues concerning centerline models of tubular structures. FIG. 1(a) depicts a curved planar reformat of an aorta from computed tomography (CT) data. Observe that the accuracy of center axis representation plays an in such visualizations. In FIG. 1(b), the left figure depicts veins that were included in a carotid artery segmentation mask due to the partial voluming effects.

There are a broad variety of tubular segmentation and modeling algorithms ranging from simple thresholding and region growing to more complex deformable models techniques, modeling vessels directly from images, etc. Traditionally, a tubular binary mask is created by a segmentation algorithm, and the centerline model is extracted by a shortest path algorithm operating on the mask. Alternatively, centerlines can be constructed directly from images by the use of vesselness or medialness filters. Surface models can then be obtained from scale information contained in these filters.

Recent technological advances in image acquisition devices, such as new multi-detector CT machines, have significantly increased the spatial resolution of image data. For example, a new CT machine can produce images in sizes of 1500×512×512. In practice, such images are often segmented by simpler segmentation algorithms such as region growing, expectation-maximization, or others, that produce results in relatively short time.

Traditional centerline detection methods typically assume that tubular structures are segmented with good accuracy. In reality, segmented masks of such tubular structures, are still far from perfect. Segmentation masks frequently have: (1) noise on the boundary; (2) holes inside due to the intensity inhomogeneities; (3) gaps in the mask due to the presence of pathologies, e.g., strong calcifications; and (4) attachment of other structures due the presence of nearby bright structures and partial voluming affects. In addition, incorrect parameter estimation in the segmentation algorithms can result in the inclusion of non-tubular structures in the segmentation mask, which can be challenging to remove. In general, morphological operations are applied to the segmentation mask to regularize mask boundaries and remove holes with certain amount of success. However, the presence of significant scale changes such as the presence of small and large vessels in the same mask can reduce the accuracy of such regularizations.

SUMMARY OF THE INVENTION

Exemplary embodiments of the invention as described herein generally include methods and systems for extracting the center axis of a tubular structure in a binary mask format which are obtained from a discrete segmentation algorithm. A method according to an embodiment of the invention includes a novel medialness measure based on fitting 2D multi-scale cross-sectional models to binary mask. These filters are designed from the assumption that tubular structures have, in general, circular shapes in cross-sectional views. This new measure works well for masks containing holes, noise in the boundary and attachment of nearby bright structures such as bones or other vessels. A minimal path detection method works on a discrete grid where the cost of graph edges are computed from multi-scale medialness filters. A full centerline tree from a single seed is extracted by a post-processing algorithm which uses the length and scale of vessel centerlines. A method according to an embodiment of the invention may also include a technique for removing non-tubular structures from binary masks. Geometric surface models can be reconstructed by 2D cross-sectional boundary detection algorithm via minimum mean cycle optimization.

In general, a method according to an embodiment of the invention can extract a center axis of a tubular shape in the presence of boundary noise, holes, gaps and nearby attached structures or pathologies due to segmentation algorithm errors. In addition, a full centerline tree with a single seed placement or without any seed can be constructed. Furthermore, surface models should be computed directly from the original image by using the detected centerlines instead of a binary mask for improved accuracy. For example, the right figure of FIG. 1(b) illustrates surface reconstruction of a carotid artery from a noisy vessel mask using the centerline and cross-sectional boundary models that were detected by a method according to an embodiment of the invention.

According to an aspect of the invention, there is provided a method for extracting a centerline of a tubular structure in a digital medical image, including providing a 3-dimensional (3D) digitized medical image, the image comprising a plurality of intensities on a 3D lattice of points and having a segmented tubular structure, providing a starting point in the tubular structure, finding a path in the image between the starting point and every other point in the tubular structure that minimizes an accumulative cost function, where the minimum accumulative cost $\phi(x)$ at a point x is a minimum of $(\phi(x')+P_{x,x'})$ over all nearest neighbors x' where $P_{x,x'}$ is a cost of propagation from point x to x', which is obtained from the inverse of a medialness measure computed in a plane orthogonal to a line between x and x' that is centered at a mid-point of the line between x and x', the medialness measure m(x) computed in a circular region C(x, R) centered at point x on the path, with radius R, given by $$m(x) = \max_R \left\{ \frac{1}{N} \sum_{i=0}^{N-1} f(x, R\vec{u}(2\pi i/N)) \right\}.$$

where $\vec{u}(\alpha) = \sin(\alpha)\vec{u}_1 + \cos(\alpha)\vec{u}_2$ and $\vec{u}_1$ and $\vec{u}_2$ define a 2D plane, and $f(x_0, R\vec{u}(\alpha))$ is a fit measure along vector $\vec{u}(\alpha)$ starting from $x_0$, $$f(x_o, R) = \max\left( \frac{\frac{1}{R}\sum_{x=x_0}^{x_0+R} I(x) - \frac{1}{M}\sum_{x=x_0+R+1}^{x_0+R+1+M} I(x)}{2}, 0 \right),$$

where M is the number of background points.

According to a further aspect of the invention, the graph is a 26-connected lattice in 3D.

According to a further aspect of the invention, the minimizing path is found using Dijkstra's algorithm, by setting a minimum accumulative cost of zero to a starting node corresponding to the starting point and a large value to all other nodes and, starting from starting node, propagating a discrete front from a node with a minimum value to neighboring nodes.

According to a further aspect of the invention, the method includes calculating a length of each minimum cost path from the starting point to each of the ending points; ordering the paths in a set based on their lengths, for each path in order from longest to shortest in the set, recomputing each path by backtracking along the path until either the starting point or a previously recomputed path is encountered, computing a length $L_C$ and average radius $R_C$ of the recomputed path, and defining a saliency of the recomputed path as $L_C/R_C$, and deleting those recomputed paths whose saliency is less than a predetermined threshold, where the remaining paths represent a centerline tree of the tubular structure.

According to a further aspect of the invention, the method includes breaking the centerline tree into a plurality of segments, and, starting from leaves of the centerline tree, iteratively removing those segments with a tubularity measurement lower than a predetermined threshold, until no more segments can be removed.

According to a further aspect of the invention, the tubularity measurement for a centerline segment $C_i$ is $$t(C_i) = \frac{1}{N}\sum_{k=1}^{N} m(C_i(k)),$$

where m is the medialness measure at a point k measured with radius R along centerline $C_i$, and N is a number of points in $C_i$.

According to a further aspect of the invention, the starting point is determined by computing a centroid point of a segmentation mask of the tubular structure, and translating the centroid point to a point defined by a local maximum of the medialness function calculated about the centroid.

According to a further aspect of the invention, the method includes, when the centroid point is not within the segmentation mask, finding a closest mask point to the centroid point.

According to another aspect of the invention, there is provided a program storage device readable by a computer, tangibly embodying a program of instructions executable by the computer to perform the method steps for extracting a centerline of a tubular structure in a digital medical image,

DETAILED DESCRIPTION OF EXEMPLARY EMBODIMENTS

Figure 1:
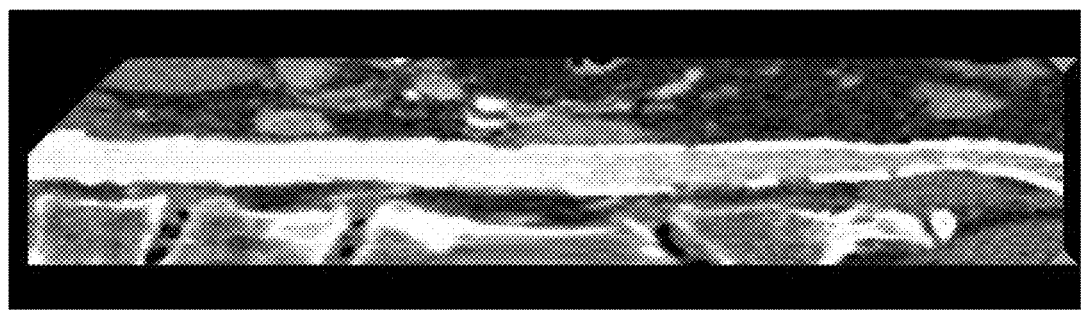
FIGS. 1(a)-(b) illustrate some of these issues concerning centerline models of tubular structures, according to an embodiment of the invention.
Figure 1:
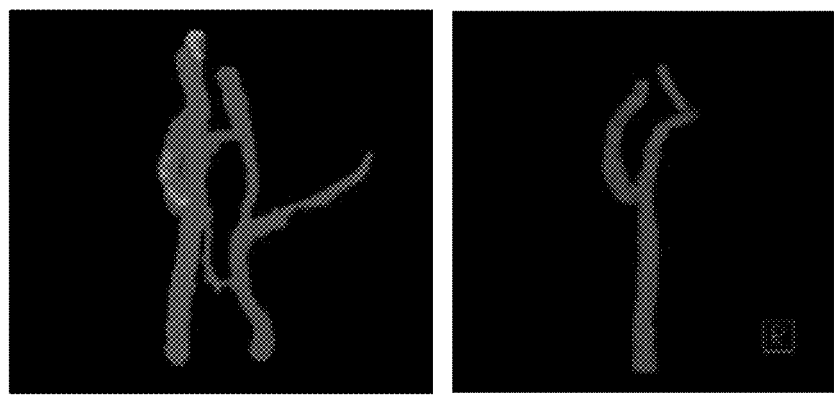

Exemplary embodiments of the invention as described herein generally include systems and methods for extracting center axes of tubular shapes in digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, where each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Medialness Measure from 2D Cross-Sectional Models

Methods extracting center axis representations from a binary mask often use distance transforms to define medialness measure. Specifically, in these techniques, the minimum distance from the boundary of a shape is assigned to each voxel as a medialness measure. For well segmented tubular shapes, a distance based medialness measure works well. However, such measures can become significantly distorted when there are holes inside mask, attached regions such as aneurysms, significant noise at the boundary, or gaps in the mask.

Tubular structures typically have circular shapes in cross-sectional views even though local variations on them are often possible. A method according to an embodiment of the invention focuses on an ideal cylindrical shape and presents a filtering method based on multiscale cross-sectional modeling. Ideally, a 2D cross-sectional cylindrical shape profile has a circular bright disk with a dark ring around it whose size may be determined by the presence of other structures in the mask. A medialness measure according to an embodiment of the invention can use this circularity assumption and intensity profile. Specifically, a medialness response, $m(x_0)$ at $x_0$, is computed in a circular region $C(x_0, R)$ centered at $x_0$, with radius R, and is given by $$m(x_0) = \max_R \left\{ \frac{1}{N} \sum_{i=0}^{N-1} f(x_0, R\vec{u}(2\pi i/N)) \right\}, \quad (1)$$

where $\vec{u}(\alpha) = \sin(\alpha)\vec{u}_1 + \cos(\alpha)\vec{u}_2$ and $\vec{u}_1$ and $\vec{u}_2$ define a 2D plane. The function $f(x_0, R\vec{u}(\alpha))$ measures the fit measure along the vector $\vec{u}(\alpha)$ starting from $x_0$, which is described below.

Suppose that tubular mask voxels are set to one (1) and the background values are set to negative one (−1), which defines a tubular model. Consider a 1D intensity profile I(x) along a ray $\vec{u}(\alpha)$ starting from $x_0$ obtained from a cross-sectional plane. Suppose that $x_0$ is the center of a cylinder with radius R. Then the boundary of a tubular structure should occur at $(x_0+R)$. An intensity profile, I(x), obtained from the mask should match the profile of 1D intensity tubular model, if $x_0$ is at the center. In an ideal match, I(x) should be 1 until $x_0+R$ and −1 after $x_0+R$. A fit measure according to an embodiment of the invention between an observed model and the expected model can be defined as $$f(x_o, R) = \max\left( \frac{\frac{1}{R}\sum_{x=x_0}^{x_0+R} I(x) - \frac{1}{M}\sum_{x=x_0+R+1}^{x_0+R+1+M} I(x)}{2}, 0 \right) \quad (2)$$

where M is the number of background voxels. Small M values can help to obtain strong background fits in narrow regions when other nearby structures are present in the mask. An exemplary, non-limiting value for M is 3. This fit function according to an embodiment of the invention yields one for perfect fits and zero if there is no fit.

Figure 2:
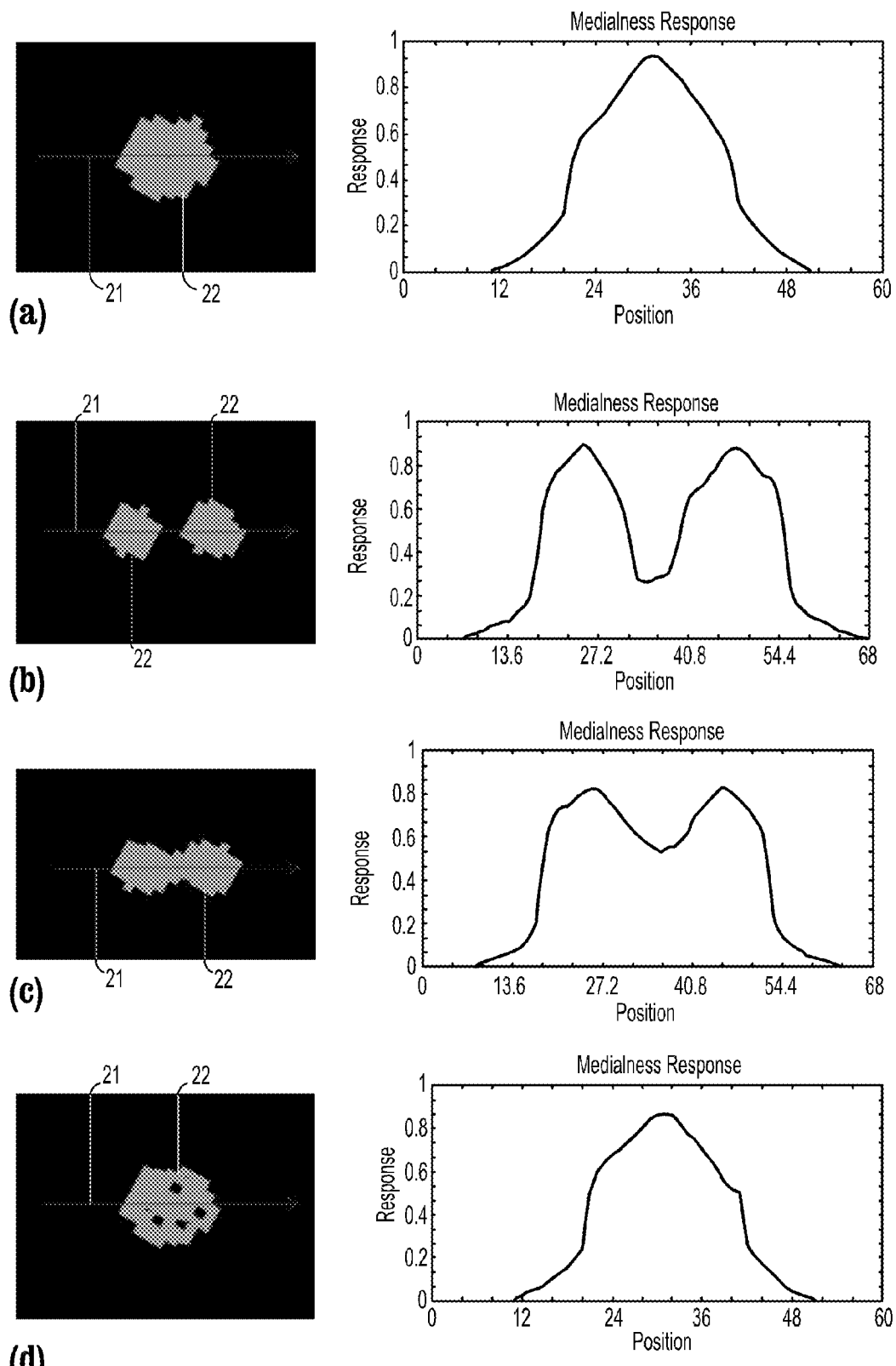
FIGS. 2(a)-(d) illustrate the medialness responses along a ray on different examples of tubular shapes, according to an embodiment of the invention.

FIGS. 2(a)-(d) illustrate the medialness responses along a ray 21 on different examples of tubular shapes. The responses graphed on the right column as a function of position are for the cross-sectional planes 22 illustrated in the left column. FIG. 2(a) depicts the results for a single isolated cylinder, where the response characteristics are very close to those that may be expected from an ideal medialness filter. Specifically, a medialness measure according to an embodiment of the invention yields strong responses at the center and responds drop rapidly towards boundaries. FIG. 2(b) depicts the results where there are two nearby tubular structure. The presence of nearby structures does not have strong impact on the responses. An approach according to an embodiment of the invention yields a very low response between two nearby tubular model. FIG. 2(c) depicts the results where there are two nearby tubular structure that touch each other. In this case, a strong response at the center is still obtained when another structure, such as another vessel or aneurysm, is attached to the tubular structure of interest. FIG. 2(d) depicts the results for a tubular structure with holes. The presence of holes does not significantly reduce the medialness response. Moreover, it should noted that a technique according to an embodiment of the invention does not require the estimation of an orthogonal plane for medialness responses. Instead, these medialness filters may be applied in multiple directions, which will illustrated in the next section.

Figure 3:
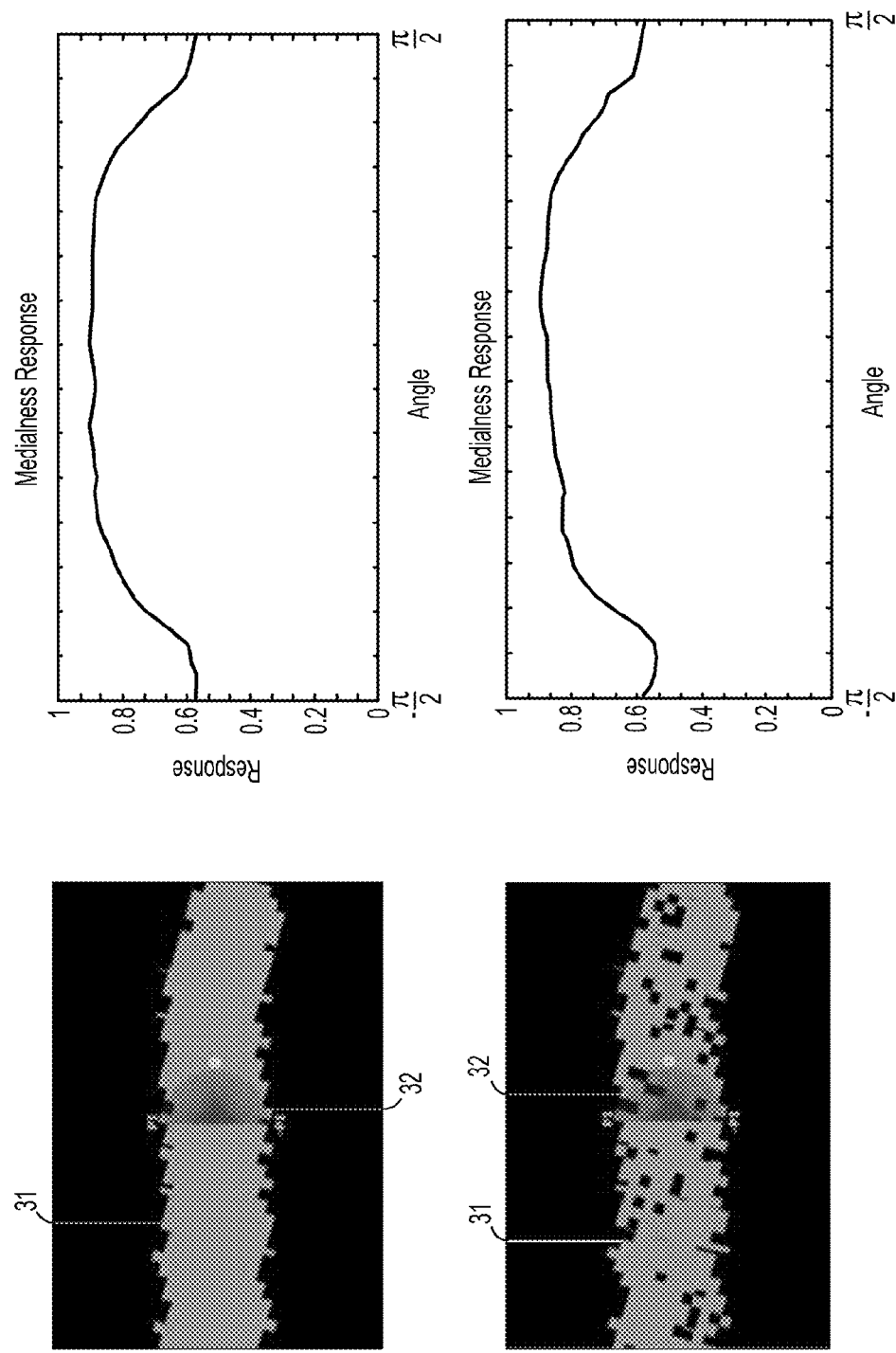
FIG. 3 depicts medialness measures of a point when the filters are applied at different orientations, according to an embodiment of the invention.

FIG. 3 depicts medialness measures of a point when the filters are applied at different orientations. The images in the left column depict a tubular structure 31 with the medialness filter orientation indicated by the arc 32, and the right column depicts graphs of the response as a function of orientation angle. High responses are obtained until 45 degrees when the vessel in the cutting plane starts to deviate significantly from the cross-sectional model. The response drops when computed from an oblique plane, Local Center-Axis from Graph-Based Optimization The medialness map of a binary mask may be constructed to obtain center axis representations which are useful in visualizing vessels in curved (or ribbon-flattened) multiplanar reformatting (MPR), in quantification of pathologies, in navigation during endovascular interventional treatments, etc. For example, the local vessel center axis between two user selected points is often sufficient for analyzing a segment of a vessel quickly in clinical applications. Thus, this section discloses a method according to an embodiment of the invention for extracting such local center axis representations by integrating the medialness map in a discrete optimization framework. Specifically, a method according to an embodiment of the invention seeks to obtain a curve C(s) between points $p_0$ and $p_1$ which travels through the center of a vessel. This curve may be found by a minimum-cost path detection algorithm. Let E(C) be the total energy along a curve C:

$$E(C) = \int_C (P(C(s)) + w(C(s))) ds, \quad (3)$$

where P(C) is a potential or cost function, w(C) is a regularization term and is constant, and s is an arc length, i.e., $\|C(s)\|^2=1$. In a vessel centerline extraction method according to an embodiment of the invention, the potential P(x) at x corresponds to the inverse of a medialness measure at that location, namely, $$P(x) = \min\left(\frac{1}{m(x)}, K\right).$$

where K is a large number. An exemplary, non-limiting value for K is 100.

Let $A_{p_0,p_1}$ represent the set of all curves between $p_0$ and $p_1$. Note that these curves may pass through regions outside of the segmentation mask. The curve with a total minimum energy can be computed from the minimum-accumulative cost, $\phi(C_p)$ which measures the minimal energy at p integrated along a curve $C_p$ starting from the point $p_0$:

$$\varphi(C_P) = \inf_{A_{P_0,P_1}} \{E(C)\} \quad (4)$$

$$= \inf_{A_{P_0,P_1}} \left\{ \int_C \left( \min\left(\frac{1}{m(C(s))}, K\right) + w(C) \right) ds \right\}.$$

According to an embodiment of the invention, this minimization may be solved using Dijkstra's algorithm in a discrete domain. Specifically, let G=(N, E) be a discrete graph where N and E represent nodes and edges, respectively, where the nodes represent voxels and the edges connect voxels. The minimum-accumulative cost at a node $N_{ij}$ for a four-connected 2D graph is then given by $$\phi(N_{ij})=\min(\phi(N_{i-1,j})+P_{i-1,j}{}^{ij},\phi(N_{i+1,j})+P_{i+1,j}{}^{ij},\phi(N_{i,j-1})+ P_{i,j-1}{}^{ij},\phi(N_{i,j+1})+P_{i,j+1}{}^{ij}). \quad (5)$$

where, for example, $P_{i-1,j}{}^{ij}$ corresponds to the cost of propagation from point $N_{i-1,j}$ to $N_{i,j}$, which is obtained from the inverse of a medialness measure according to an embodiment of the invention. The medialness measure is computed in a plane that is orthogonal to a line between $N_{i-1,j}$ and $N_{i,j}$ and that is centered at the mid-point of this line between $N_{i-1,j}$ and $N_{i,j}$. More generally, the minimum-accumulative cost at a node N is a minimum of the function $\phi(N')+P_{N,N'}$ over all nearest neighbors N'.

This minimization according to an embodiment of the invention can be implemented by first setting a minimum accumulative cost of zero to the starting node and infinity (or a large value) to all other nodes and then using an explicit discrete front propagation method where propagation always proceeds from the minimum value to its neighboring nodes. According to an embodiment of the invention, a 26-connected lattice in 3D may be used, where diagonal propagations are also included for improved accuracy. In addition, a medialness measure according to an embodiment of the invention may be computed orthogonal to the direction of propagation at the mid-point between the nodes instead of being computed at the nodes themselves. Discrete front propagation starts from a source and stops when it reaches the sink. The discrete path (curve) from sink node $N_1$ corresponding to sink point $p_1$ to source node $N_0$ corresponding to source point $p_0$ can then be obtained by traversing (backtracking) along the propagation path.

A minimum-cost path finding algorithm according to an embodiment of the invention uses the medialness measure as the cost of a graph edge and its orthogonal computation to these graph edge during propagations. This orthogonal computation increases accuracy and computational efficiency since the costs obtained on cross sections are small, due to a high medialness response. In other words, a front propagates faster in the center and slower towards the boundaries due to this fact. A centerline extraction algorithm according to an embodiment of the invention may also be viewed as a minimum-cost cross-sectional plane estimation algorithm since the propagation prefers directions which produces better cross-sections.

Figure 4:
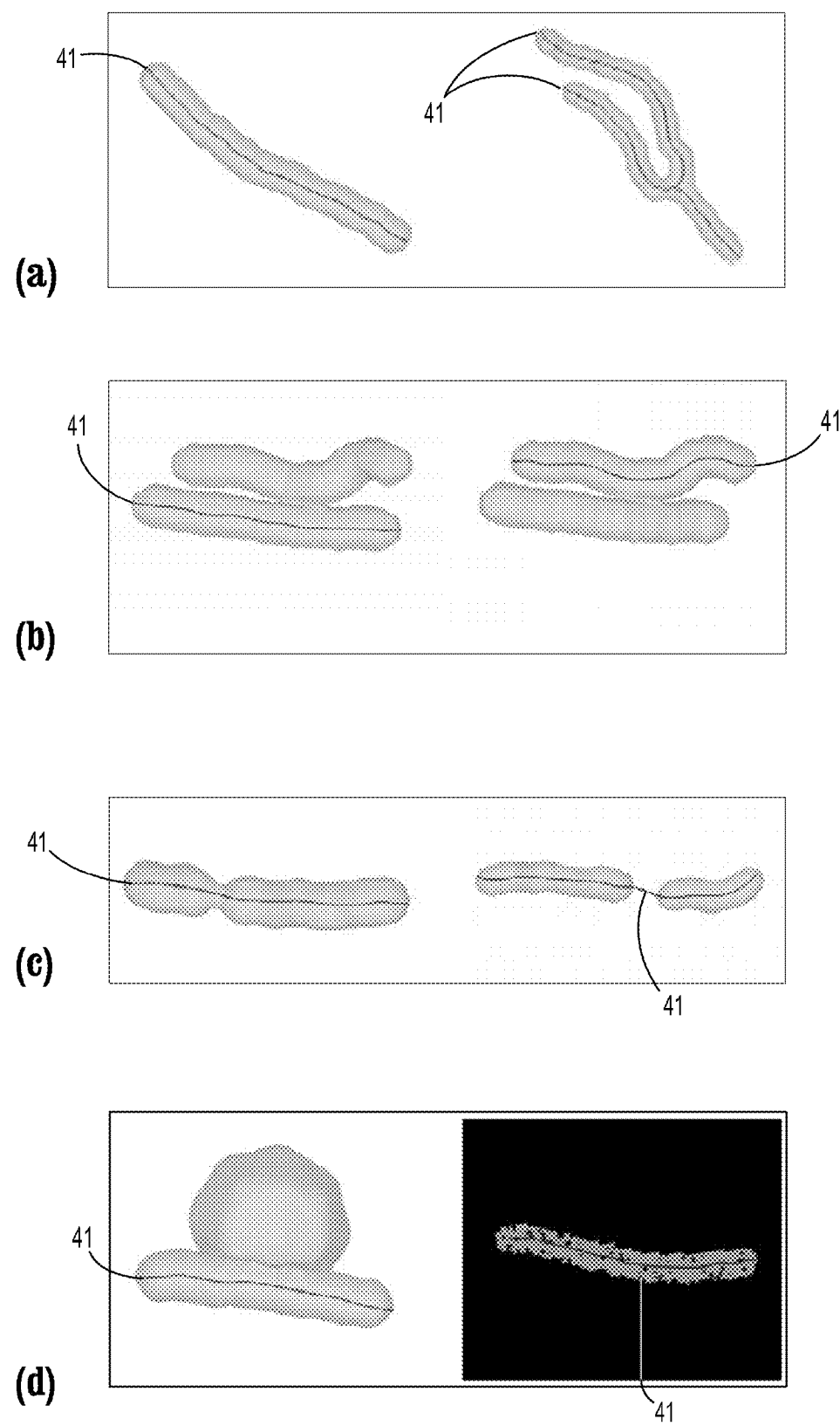
FIGS. 4(a)-(d) illustrate centerline models obtained between a source and a sink placed by a user on different synthetic data sets, according to an embodiment of the invention.

FIGS. 4(a)-(d) illustrate centerline models obtained between a source and a sink placed by a user on different synthetic data sets. In each figure, the centerline is indicated by reference number 41. Observe that each figure illustrates a different situation associated with centerline detection algorithms. FIG. 4(a) depicts the results using a normal tube and a tube with two branches. FIG. 4(b) depicts the results where nearby tubular structures are attached. FIG. 4(c) depicts the results in the presence of a narrowing and a gap. FIG. 4(d) depicts the results in the presence of a non-tubular attachment such as an aneurysm or noise inside a mask. In general, a method according to an embodiment of the invention is able to detect a centerline model accurately from a mask which may contains holes, noise, gaps and attachment of other structures. Regarding holes, it may be assumed that the source and sink may be located on non-connected segments such as the presence of a total occlusion on a vessel. Centerlines of such tubular shapes are then obtained by allowing propagation on backgrounds until all sink points are reached.

Figure 5:
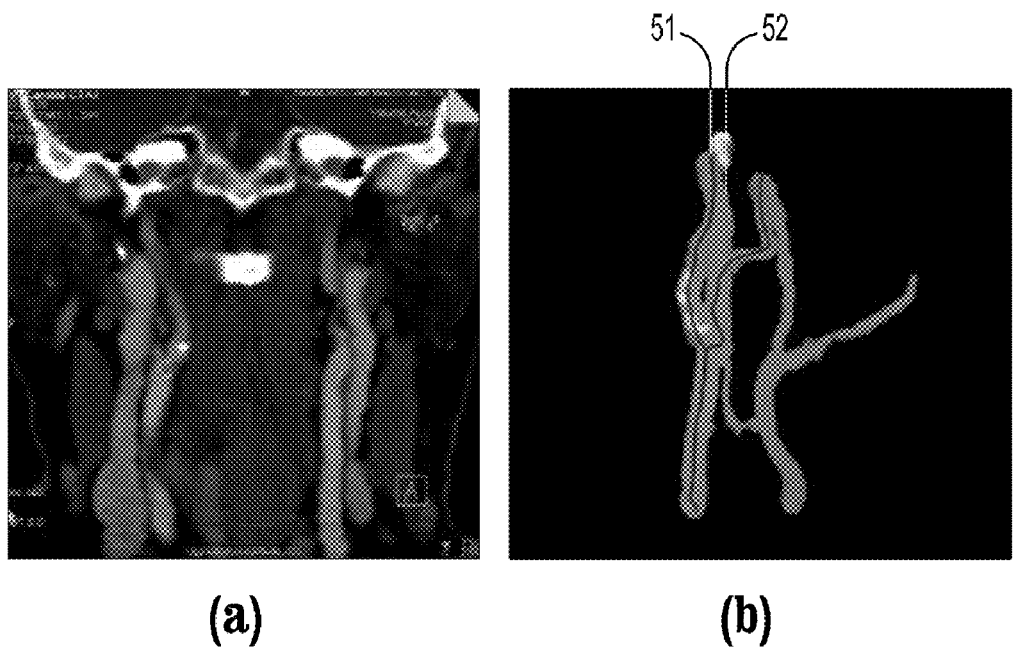
FIGS. 5(a)-(b) illustrates CTA data where a carotid artery segmentation includes veins in the segmentation mask and shows the correctly determined center axis, according to an embodiment of the invention.

FIGS. 5(a)-(b) illustrates CTA data where a carotid artery segmentation includes veins in the segmentation mask and shows the correctly determined center axis. FIG. 5(a) shows both arteries and veins present in high contrast. The segmentation of an artery includes veins in the mask. FIG. 5(b) shows the centerline model of the carotid artery, which was accurately extracted by a single source and two sink seed placements. Observe that the centerline 51 of the carotid artery 52 was not affected by the presence of a vein in the mask.

Centerline Tree Extraction

According to an embodiment of the invention, the local centerline detection may be extended to recover a full centerline tree from a single point, such as a source which may be initialized by a user or another process. Recall that a local centerline detection algorithm according to an embodiment of the invention terminates when the propagation front reaches a sink, which is an end point. When there is no sink point defined for explicit stopping, the propagation should continue until it reaches every voxel of the segmentation mask. It is possible for the propagation to continue on the background if there are disconnected pieces in the mask. When all voxels have a minimal path from the source, the propagation stops. However, a correct centerline tree may be determined from the converged propagation.

Figure 6:
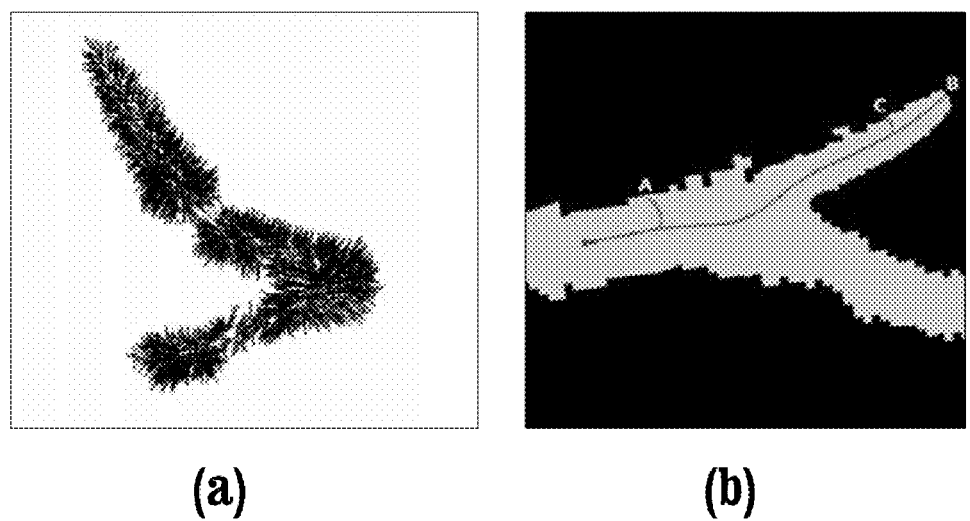
FIGS. 6(a)-(b) illustrate a branch removal process, according to an embodiment of the invention.

Suppose that the propagation has converged at time $t_f$ with a set of graph nodes, $F=(P_1, \ldots, P_K)$, representing a discrete front F, such as that shown in FIG. 6(a). A minimum-cost path between each point $P_i$ of a discrete front, F and the source $P_0$ can be computed from the minimum accumulative cost map, $\phi$, resulting in K different paths. Most of these paths are redundant, i.e., a single vessel branch should be represented by a single centerline or a single front point. In addition, the existence of a tubular segment can be determined by its length, LB and its approximate radius, RB along its centerline, C, i.e., LB>>RB, where the centerline length is $\int_C ds$. FIG. 6(b) illustrates the selecting of one centerline for each tubular branch via an example having three points A, B, C on a boundary and their corresponding minimum-cost paths. It is clear that the point B with its path CB represents a branch while the front point A does not since the length of its path is similar to its radius. The front point C may be considered as representing a branch since the length of its minimal path to the source $P_0$ is significant relative to its average radius. However, the path CB represents the branch better than the path CC starting from C. These observations suggest that a front point with the longest path represents a branch better when there are several front points on the same boundary, which is the case after stopping the propagation. Thus, the centerlines starting from A and C are removed while the centerline from B is kept.

Figure 12:
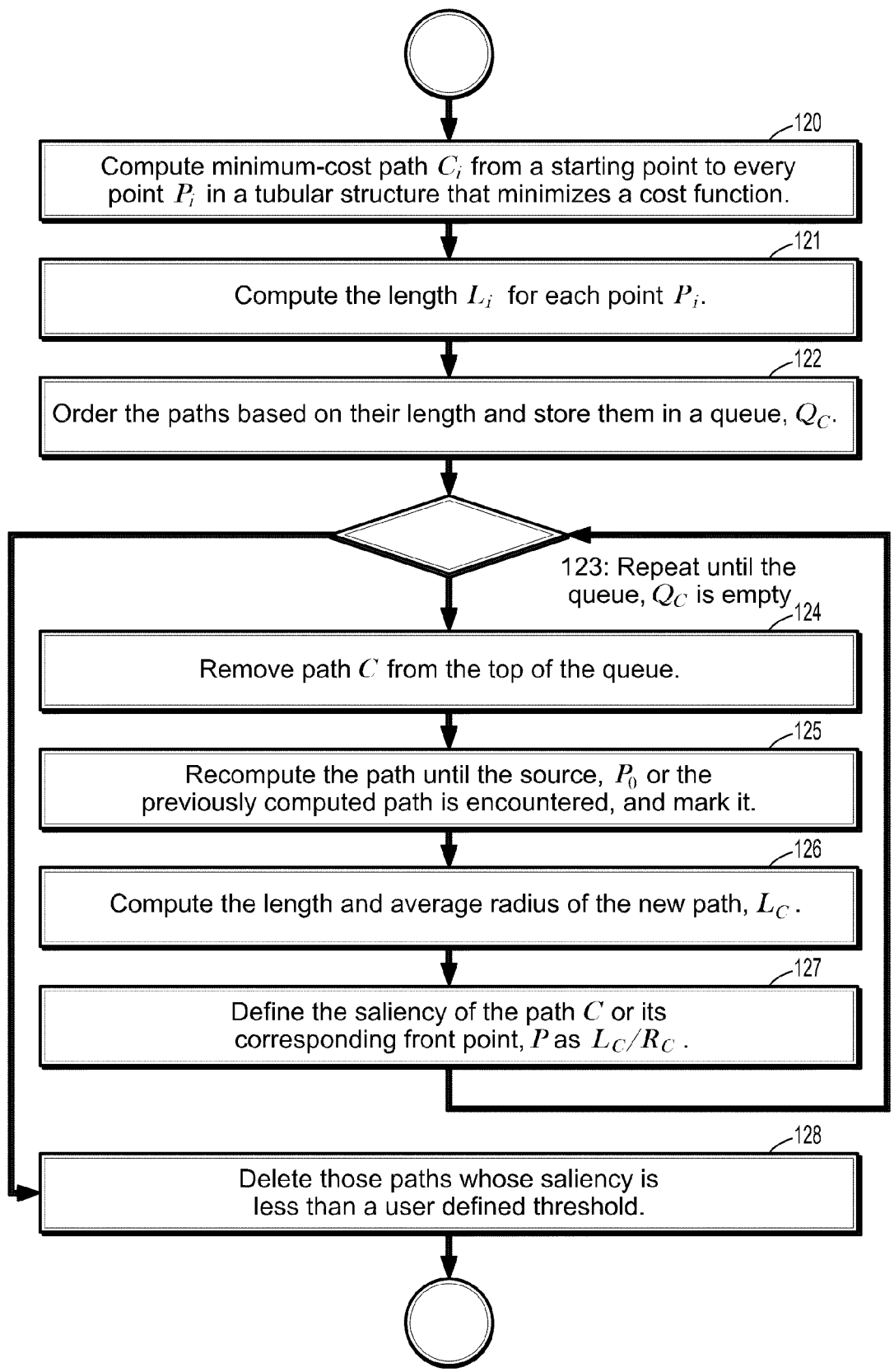
FIG. 12 is a flowchart of a branch removal process according to an embodiment of the invention.

A branch removal process according to an embodiment of the invention can be efficiently implemented with the following algorithm, illustrated in the flowchart of FIG. 12.

1. Find, at step 120, a path $C_i$ in the image from a starting point to every other point $P_i$ in the tubular structure that minimizes the aforementioned accumulative cost function.

2. Given a set of graph nodes, $F=(P_1, \ldots, P_K)$ from the converged centerline propagation, compute, at step 121, the length $L_i$ for each point $P_i$ in the discrete front set F.

3. At step 122, order the paths based on their length and store them in a queue, $Q_C$, with the maximum length path on top 4. At step 123, repeat steps (a), (b), (c), and (d) until the queue, $Q_C$ is empty.
   (a) Select, at step 124, the path C from the top of the queue and remove it from the queue.
   (b) Recompute the path by backtracking until the source, $P_0$ or a marked, previously computed path on the minimum-accumulative cost map is encountered, at step 125, and
   (c) mark the path in the minimum-accumulative cost map while backtracking.
   (d) At step 126, compute the length $L_C$ of the new path and average radius $R_C$ from the scale information contained in the medialness filters.
   (e) At step 127, set the saliency of the path C or its corresponding front point, P as $L_C/R_C$.

5. At step 128, delete those paths whose saliency is less than a user defined threshold.

In an experiment of an embodiment of the invention, the saliency threshold is set to 2.0, which means that length of a tubular branch should be two times greater than its average radius along its centerline, otherwise it does not appear to be a significant branch.

Figure 7:
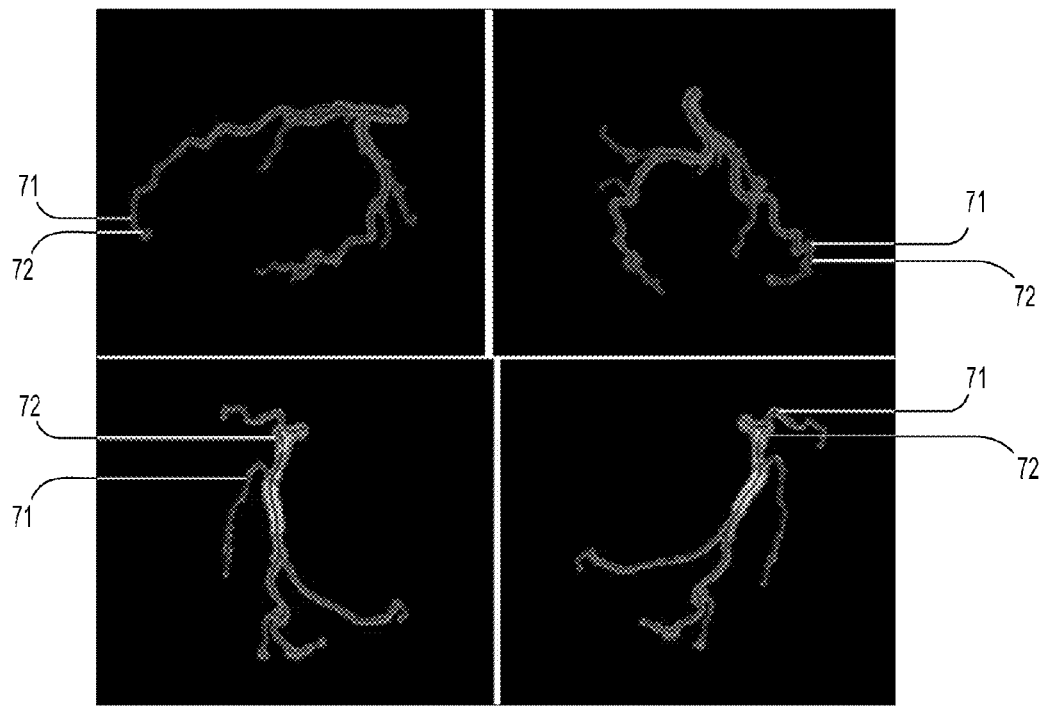
FIG. 7 illustrates some examples of centerline trees for vessels, according to an embodiment of the invention.

Observe that an algorithm according to an embodiment of the invention should have a source point from where the propagation starts and the minimal paths end. In most clinical applications, a user can easily place a single point in such locations. Alternatively, the beginning of a tubular tree, such as an airway, a coronary artery, or the portal vein, can be automatically determined by another process. For example, the beginning of a coronary artery, namely an ostia point, can be detected from an aorta and vessel segmentation algorithm. Similarly, the beginning of an airway can be easy to detect. FIG. 7 illustrates some examples of centerline trees for vessels, specifically center axis representations 71 of coronary arteries 72 which are segmented by an interactive region growing algorithm according to an embodiment of the invention.

It is possible that there may not be an obvious starting location for a tubular structure. In such cases, according to an embodiment of the invention, the centroid of the mask may be used as the source. Since the centroid may be outside the mask, one may need to determine the closest mask point from the detected centroid. In addition, according to an embodiment of the invention, this source point may be further moved to the center of the tubular structure by computing the local maxima on the medialness response map.

Removal of Non-Tubular Segments

Segmentation algorithms often include regions in the segmentation masks that do not correspond to any tubular structures. For example, during the segmentation of left coronary artery, nearby bright area such as the left ventricle of a heart, can be included in the mask due to the brightness similarity. This is called "leakage" in intensity based vessel segmentation algorithms. Similar errors may occur when the parameters of segmentation algorithms are not estimated correctly, which may result in the inclusion of a non-tubular local region in a mask.

An algorithm according to an embodiment of the invention for removing such non-tubular structures from a mask may be based on the centerline models and medialness filters. First, a tubularity measure should be defined for each segment of a centerline. Specifically, a tubular model should have a substantially circular cross-sectional shape, which can be measured by medialness filters according to an embodiments of the invention applied orthogonal to their centerline models. The tubularity measure $t(C_i)$ for a centerline segment $C_i$ is then given from the integration of circularity fit measured along the centerline, $C_i$. An algorithm according to an embodiment of the invention uses medialness filters to measure the circularity fit for each point. The tubularity measure $t(C_i)$ is then $$t(C_i) = \frac{1}{N}\sum_{k=1}^{N} m_R(C_i(k)). \tag{6}$$

where $m_R$ is the medialness measure at a point k measured with radius R along a centerline $C_i$ with N points. Note that the medialness responses are computed in the orthogonal planes which are determined from the local orientation of the corresponding centerline. For an ideal cylinder, this tubularity measure is close to one and similarly, it is close to zero for non-tubular structures.

Figure 8:
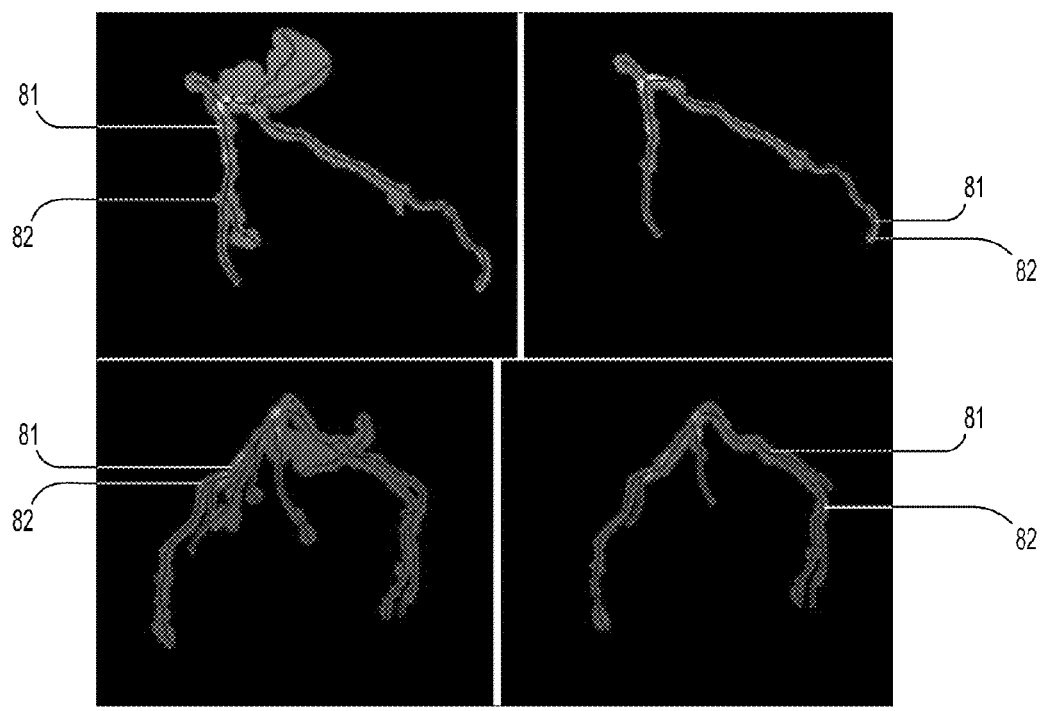
FIG. 8 illustrates examples of removal of non-tubular structures by removing their centerlines, according to an embodiment of the invention.

An iterative centerline removal process according to an embodiment of the invention is based on the tubularity measure. Observe that removing a centerline corresponds to the removal of a region from its mask. Specifically, first, each centerline is broken into smaller segments and their corresponding tubularity measure is computed. Centerlines are broken into smaller pieces so that only non-tubular parts are eliminated. The removal of non-tubular structures is then accomplished by iteratively removing centerline segments which have low tubularity measures and which are located at the leaves of a tree. In other words, a removal process according to an embodiment of the invention starts from the leaves and propagates upward until no more segments can be removed, which guarantees that no gap is created in the centerline tree. In an experiment of an embodiment of the invention, the threshold value for the tubularity measure is set to 0.85. i.e., segments with lower value can be viewed as being non-tubular. FIG. 8 illustrates examples where the segmentation mask 82 includes a leakage. This non-tubular leakage is removed by the by removing the centerlines 81. In each row in FIG. 8, the left image depicts the segmentation mask with the non-tubular leakage, and the right image depicts the tubular structure with the leakage removed.

Surface Modeling Via 2D Cross-Sectional Boundaries

The center axis representation by itself is useful in constructing curved MPR visualization, which is popular in clinical applications. However, surface representations in addition to the centerlines are useful for the quantification of pathologies, stent planning and follow-up studies. Traditionally, surface models are created by the scale information contained in the centerline representation. For example, each centerline point may be associated with scale information which is then used to construct the vessel boundaries. Similarly, centerline points according to an embodiment of the invention are also associated with a scale which provides a maximum medialness response. However, this scale information is not sufficiently accurate to fully represent vessel surface models since they are computed from the binary mask. An algorithm according to an embodiment of the invention can construct a surface model by sub-voxel 2D cross-sectional models directly from original data.

Figure 9:
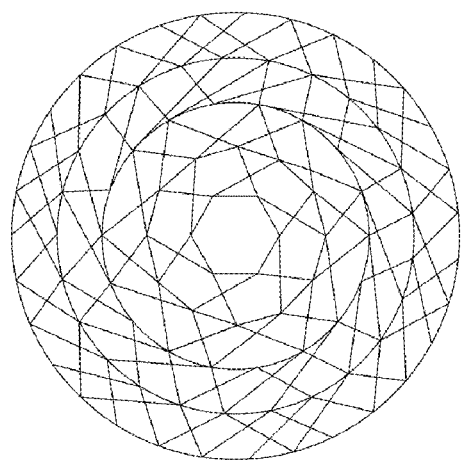
FIGS. 9(a)-(b) illustrate a cross-sectional boundary detection result of the invention on a carotid artery, according to an embodiment of the invention.
Figure 9:
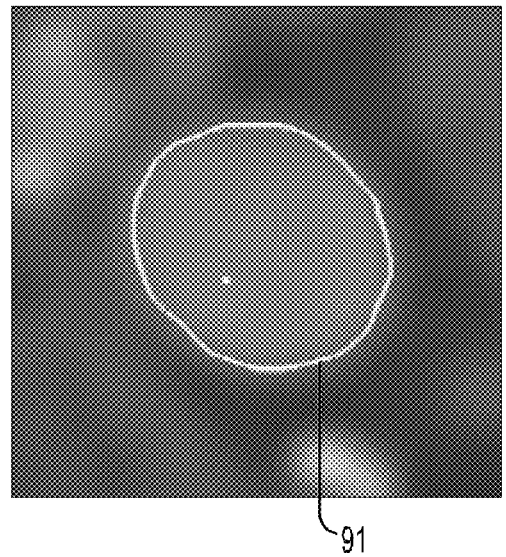

An algorithm according to an embodiment of the invention uses a minimum mean cycle optimization on directed graphs for the cross-sectional boundary detection, by finding a cycle (contour) in a graph such that its average cost is the minimum. The average cost of a cycle is the ratio of the sum of all edge weights on the cycle by its length, which is the number of edges on the cycle. Mathematically, let G=(N, E) be a graph with n vertices (N) and m weighted edges (E). A cycle, C on G is a path having a subset of edges such that its first node is the last. The total cost and length of a cycle is the sum of weights, w(C) and sum of lengths, |C| of edges on that cycle, respectively. A minimum mean cycle algorithm according to an embodiment of the invention finds a cycle that minimizes the ratio of the total cost of the cycle by its length, w(C)/|C|. Algorithms are known for implementing a minimum mean cycle calculation. One exemplary, non-limiting, minimum mean cycle algorithm is Howard's algorithm, which is known for its accuracy and computationally efficiency, which is O(m). FIGS. 9(a)-(b) illustrate a cross-sectional boundary detection result from an algorithm according to an embodiment of the invention on a carotid artery. FIG. 9(a) depicts a cyclic graph representation, in which each vertex on a ray is connected to three different vertices on the neighboring nodes, allowing flexibility in cycles. FIG. 9(b) depicts the carotid cross sectional boundary 91 obtained from CTA data.

Figure 10:
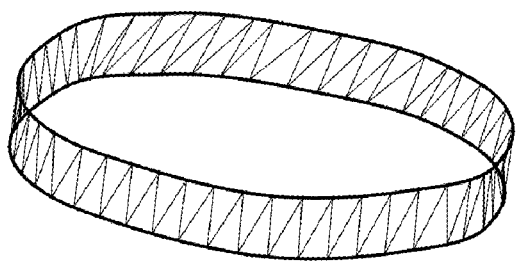
FIG. 10 illustrates the construction of 3D triangulated surface from two successive contours, according to an embodiment of the invention.
Figure 11:
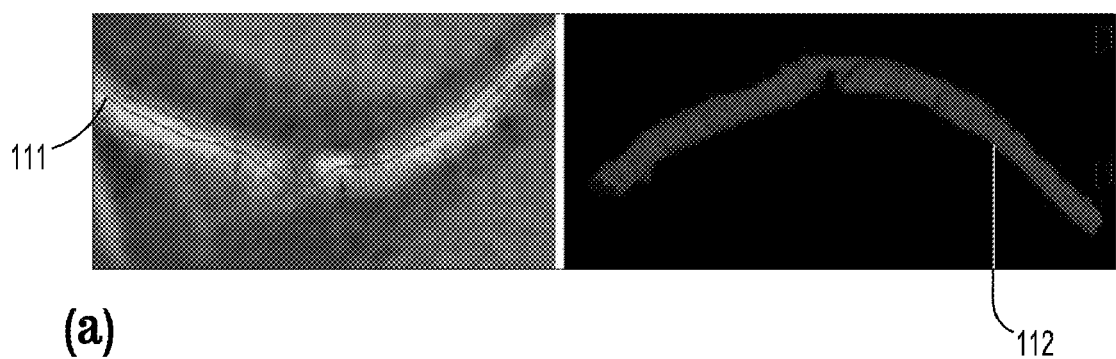
FIGS. 11(a)-(c) illustrate vessel surface models, according to an embodiment of the invention.
Figure 11:
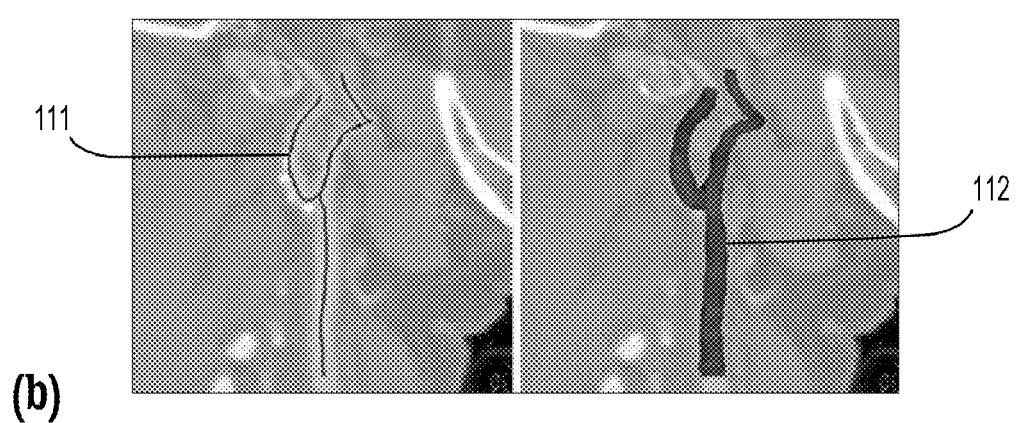
Figure 11:
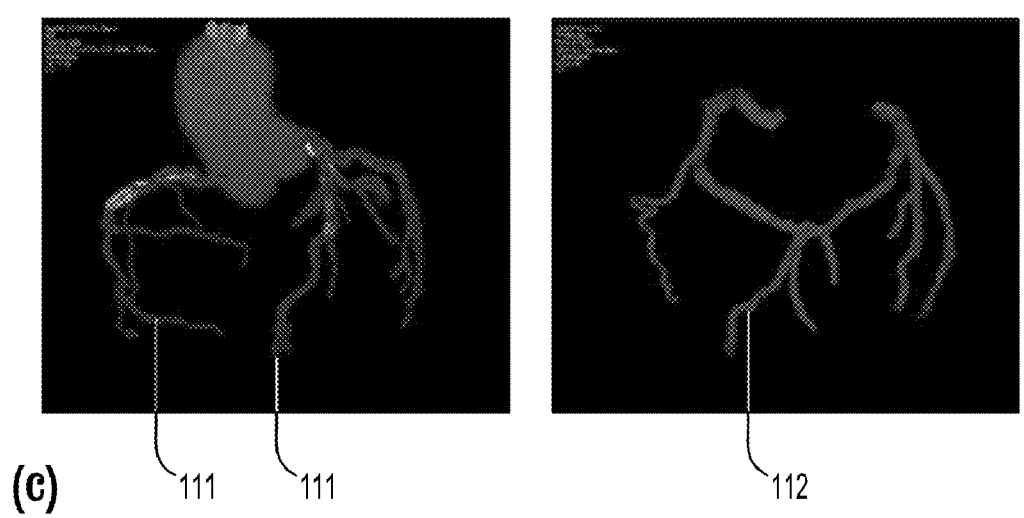

A surface construction method according to an embodiment of the invention is based on these 2D cross-sectional segmentations. Specifically, sub-voxel accurate cross-sectional boundaries are constructed at several locations of a given centerline model. A 3D surface model is then constructed from these 2D contours. Specifically, successive 2D contours are used to construct a local triangulation surface by finding the corresponding points of each contours, i.e., points that are closest to each other. FIG. 10 illustrates the construction of 3D triangulated surface from two successive contours. The vessel surface models constructed from an algorithm according to an embodiment of the invention are shown in FIGS. 11(a)-(c). This figure illustrates the centerline 111 in the left column images and surface models 112 in the right column images for a coronary vessel with a strong stenosis in FIG. 11(a), a carotid artery from CTA data in FIG. 11(b), and for a coronary artery tree in FIG. 11(c).

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 13:
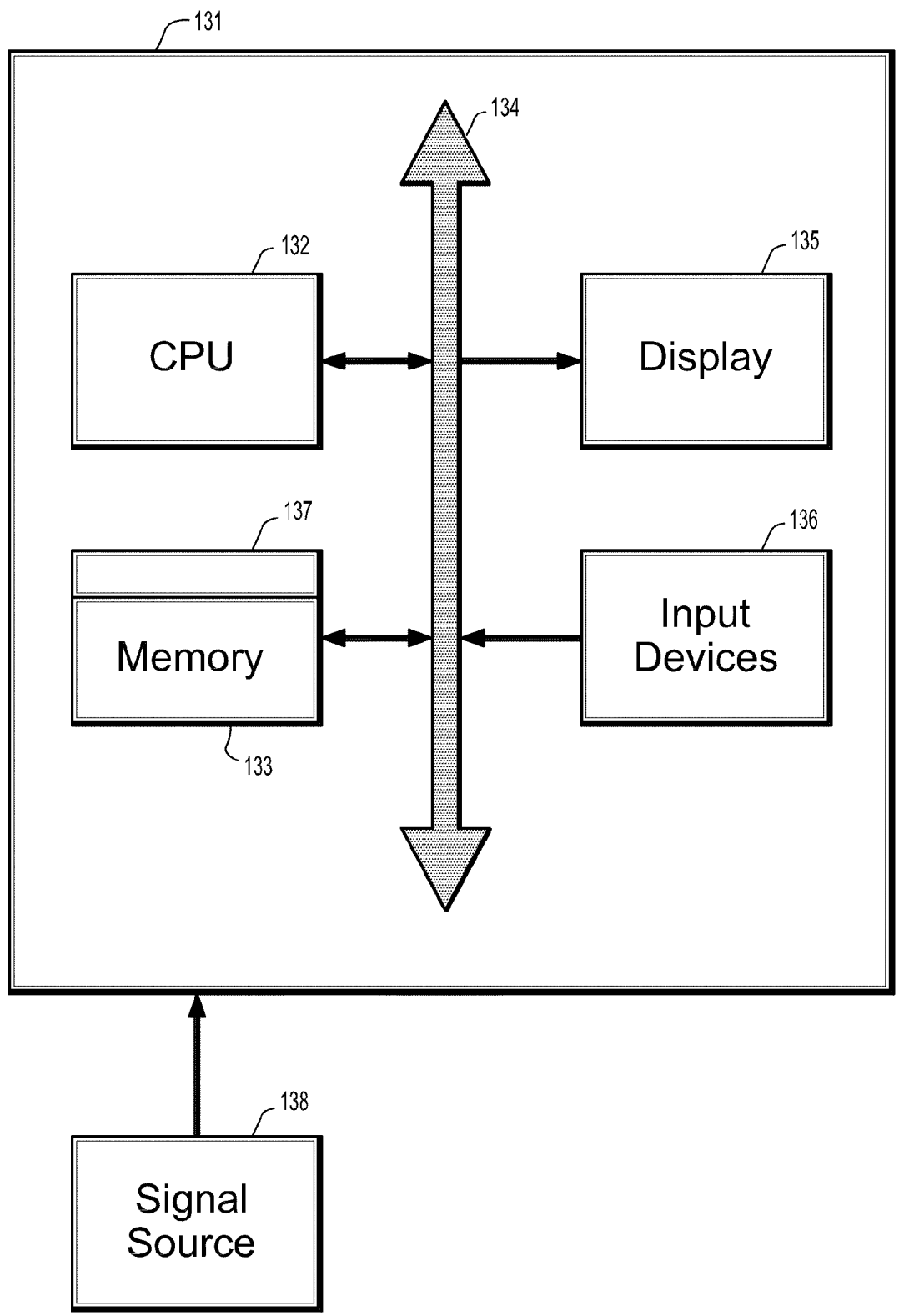
FIG. 13 is a block diagram of an exemplary computer system for implementing a method for extracting center axes of tubular shapes in digital medical images, according to an embodiment of the invention.

FIG. 13 is a block diagram of an exemplary computer system for implementing a method for extracting center axes of tubular shapes in digital medical images, according to an embodiment of the invention. Referring now to FIG. 13, a computer system 131 for implementing the present invention can comprise, inter alia, a central processing unit (CPU) 132, a memory 133 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present invention can be implemented as a routine 137 that is stored in memory 133 and executed by the CPU 132 to process the signal from the signal source 138. As such, the computer system 131 is a general purpose computer system that becomes a specific purpose computer system when executing the routine 137 of the present invention.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of extracting a centerline of a tubular structure in a digital medical image, the method performed by the computer comprising the steps of:

providing a 3-dimensional (3D) digitized medical image, said image comprising a plurality of intensities on a 3D lattice of points and having a segmented tubular structure;

providing a starting point in said tubular structure;

finding a path in said image between the starting point and every other point in the tubular structure that minimizes an accumulative cost function, wherein said minimum accumulative cost $\phi(x)$ at a point x is a minimum of $(\phi(x')+P_{x,x'})$ over all nearest neighbors x' wherein $P_{x,x'}$ is a cost of propagation from point x to x', which is obtained from the inverse of a medialness measure computed in a plane orthogonal to a line between x and x' that is centered at a mid-point of said line between x and x', said medialness measure m(x) computed in a circular region C(x, R) centered at point x on said line, with radius R, given by $$m(x) = \max_R \left\{ \frac{1}{N} \sum_{i=0}^{N-1} f(x, R\vec{u}(2\pi i/N)) \right\},$$

wherein $\vec{u}(\alpha)=\sin(\alpha)\vec{u}_1+\cos(\alpha)\vec{u}_2$ and $\vec{u}_1$ and $\vec{u}_2$ define a 2D plane, and $f(x_0, R\vec{u}(\alpha))$ is a fit measure along vector $\vec{u}(\alpha)$ starting from $x_0$, $$f(x_o, R) = \max\left(\frac{\frac{1}{R}\sum_{x=x_0}^{x_0+R} I(x) - \frac{1}{M}\sum_{x=x_0+R+1}^{x_0+R+1+M} I(x)}{2}, 0\right),$$

wherein M is the number of background points.

2. The method of claim 1, wherein said graph is a 26-connected lattice in 3D.

3. The method of claim 1 wherein said minimizing path is found using Dijkstra's algorithm, by setting a minimum accumulative cost of zero to a starting node corresponding to said starting point and a large value to all other nodes and, starting from starting node, propagating a discrete front from a node with a minimum value to neighboring nodes.

4. The method of claim 1, further comprising:
calculating a length of each minimum cost path from said starting point to each of the ending points;
ordering the paths in a set based on their lengths;
for each path in order from longest to shortest in said set, recomputing each path by backtracking along said path until either the starting point or a previously recomputed path is encountered, computing a length $L_C$ and average radius $R_C$ of the recomputed path, and defining a saliency of said recomputed path as $L_C/R_C$; and
deleting those recomputed paths whose saliency is less than a predetermined threshold, wherein the remaining paths represent a centerline tree of said tubular structure.

5. The method of claim 4, further comprising breaking said centerline tree into a plurality of segments, and, starting from leaves of said centerline tree, iteratively removing those segments with a tubularity measurement lower than a predetermined threshold, until no more segments can be removed.

6. The method of claim 4, wherein said tubularity measurement for a centerline segment $C_i$ is $$t(C_i) = \frac{1}{N} \sum_{k=1}^{N} m(C_i(k)),$$

where m is the medialness measure at a point k measured with radius R along centerline $C_i$, and N is a number of points in $C_i$.

7. The method of claim 1, wherein said starting point is determined by computing a centroid point of a segmentation mask of said tubular structure, and translating said centroid point to a point defined by a local maximum of said medialness function calculated about said centroid.

8. The method of claim 7, further comprising, when said centroid point is not within said segmentation mask, finding a closest mask point to said centroid point.

9. A computer-implemented method of extracting a centerline of a tubular structure in a digital medical image, the method performed by the computer comprising the steps of:
providing a starting point and an ending point in a tubular structure in a digital medical image;
finding a path in said image between the starting point and the ending point that minimizes an accumulative cost function with respect to all possible paths between said starting point and said ending point,
wherein said cost function is $E(C)=\int_C (P(C(s))+w(C(s)))ds$, wherein C is a path, s is an arc length along said path, $P(C(s))$ is a potential function evaluated at a point on said path, and $w(C)$ is a constant regularization term, wherein said potential $P(x)$ at x corresponds to an inverse of a medialness measure $m(x)$ at that location computed in a circular region $C(x, R)$ centered at point x on said path, with radius R, given by $$m(x) = \max_R \left\{ \frac{1}{N} \sum_{i=0}^{N-1} f(x, R\vec{u}(2\pi i/N)) \right\},$$

wherein $\vec{u}(\alpha)=\sin(\alpha)\vec{u}_1+\cos(\alpha)\vec{u}_2$ and $\vec{u}_1$ and $\vec{u}_2$ define a 2D plane, and $f(x_0, R\vec{u}(\alpha))$ is a fit measure along vector $\vec{u}(\alpha)$ starting from $$x_0 \cdot f(x_o, R) = \max\left(\frac{\frac{1}{R}\sum_{x=x_0}^{x_0+R} I(x) - \frac{1}{M}\sum_{x=x_0+R+1}^{x_0+R+1+M} I(x)}{2}, 0\right),$$

wherein M is the number of background points, and
wherein said path is a centerline of said tubular structure.

10. The method of claim 9, wherein said cost function is minimized in a discrete domain wherein said image is represented as a graph whose nodes correspond to image points and whose edges correspond to connections between neighboring points, and a minimum accumulative cost $\phi(N)$ at a node N is a minimum of $(\phi(N')+P_{N,N'})$ over all nearest neighbors N' wherein $P_{N,N'}$ is a cost of propagation from point N to N', which is obtained from the inverse of said medialness measure computed in a plane orthogonal to a line between N and N' that is centered at a mid-point of said line between N and N'.

11. The method of claim 10, further comprising finding a plurality of cycles in said graph, each cycle centered about a point on said centerline and having a minimal average cost, constructing a local triangulated surface between successive cycles by connecting corresponding points on said cycles, wherein said triangulated surface represents a surface of said tubular structure.

12. The method of claim 11, wherein said average cost of a cycle is a ratio of a sum of weights of each graph edge in said cycle to a number of edges in said cycle.

13. A program storage device readable by a computer, tangibly embodying a program of instructions executable by the computer to perform the method steps for extracting a centerline of a tubular structure in a digital medical image, the method comprising the steps of:
providing a 3-dimensional (3D) digitized medical image, said image comprising a plurality of intensities on a 3D lattice of points and having a segmented tubular structure;
providing a starting point in said tubular structure;
finding a path in said image between the starting point and every other point in the tubular structure that minimizes an accumulative cost function, wherein said minimum accumulative cost $\phi(x)$ at a point x is a minimum of $(\phi(x')+P_{x,x'})$ over all nearest neighbors x' wherein $P_{x,x'}$ is a cost of propagation from point x to x', which is obtained from the inverse of a medialness measure computed in a plane orthogonal to a line between x and x' that is centered at a mid-point of said line between x and x', said medialness measure m(x) computed in a circular region C(x, R) centered at point x on said path, with radius R, given by $$m(x) = \max_{R}\left\{\frac{1}{N}\sum_{i=0}^{N-1} f(x, R\vec{u}(2\pi i/N))\right\},$$

wherein $\vec{u}(\alpha)=\sin(\alpha)\vec{u}_1+\cos(\alpha)\vec{u}_2$ and $\vec{u}_1$ and $\vec{u}_2$ define a 2D plane, and $f(x_0,R\vec{u}(\alpha))$ is a fit measure along vector $\vec{u}(\alpha)$ starting from $$x_0, f(x_o, R) = \max\left(\frac{\frac{1}{R}\sum_{x=x_0}^{x_0+R} I(x) - \frac{1}{M}\sum_{x=x_0+R+1}^{x_0+R+1+M} I(x)}{2}, 0\right),$$

wherein M is the number of background points.

14. The computer readable program storage device of claim 13, wherein said graph is a 26-connected lattice in 3D.

15. The computer readable program storage device of claim 13, wherein said minimizing path is found using Dijkstra's algorithm, by setting a minimum accumulative cost of zero to a starting node corresponding to said starting point and a large value to all other nodes and, starting from starting node, propagating a discrete front from a node with a minimum value to neighboring nodes.

16. The computer readable program storage device of claim 13, the method further comprising:
calculating a length of each minimum cost path from said starting point to each of the ending points;
ordering the paths in a set based on their lengths;
for each path in order from longest to shortest in said set, recomputing each path by backtracking along said path until either the starting point or a previously recomputed path is encountered, computing a length $L_C$ and average radius $R_C$ of the recomputed path, and defining a saliency of said recomputed path as $L_C/R_C$; and
deleting those recomputed paths whose saliency is less than a predetermined threshold, wherein the remaining paths represent a centerline tree of said tubular structure.

17. The computer readable program storage device of claim 16, the method further comprising breaking said centerline tree into a plurality of segments, and, starting from leaves of said centerline tree, iteratively removing those segments with a tubularity measurement lower than a predetermined threshold, until no more segments can be removed.

18. The computer readable program storage device of claim 16, wherein said tubularity measurement for a centerline segment $C_i$ is $$t(C_i) = \frac{1}{N}\sum_{k=1}^{N} m(C_i(k)),$$

where m is the medialness measure at a point k measured with radius R along centerline $C_i$, and N is a number of points in $C_i$.

19. The computer readable program storage device of claim 13, wherein said starting point is determined by computing a centroid point of a segmentation mask of said tubular structure, and translating said centroid point to a point defined by a local maximum of said medialness function calculated about said centroid.

20. The computer readable program storage device of claim 19, the method further comprising, when said centroid point is not within said segmentation mask, finding a closest mask point to said centroid point.

* * * * *